US012803078B2

(12) United States Patent
Arnesson et al.

(10) Patent No.: US 12,803,078 B2
(45) Date of Patent: Nov. 17, 2026

(54) BATTERY STACK COMPRISING BATTERY MODULES AND A COOLING PLATE

(71) Applicant: VOLVO TRUCK CORPORATION, Gothenburg (SE)

(72) Inventors: Simon Arnesson, Öckerö (SE); Ringolds Jargans, Trollhättan (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 690 days.

(21) Appl. No.: 18/343,257

(22) Filed: Jun. 28, 2023

(65) Prior Publication Data

US 2024/0014463 A1 Jan. 11, 2024

(30) Foreign Application Priority Data

Jul. 11, 2022 (EP) .................................... 22184106

(51) Int. Cl.
*H01M 10/6556* (2014.01)
*B60L 50/64* (2019.01)
(Continued)

(52) U.S. Cl.
CPC ......... *H01M 10/6556* (2015.04); *B60L 50/64* (2019.02); *H01M 10/613* (2015.04);
(Continued)

(58) Field of Classification Search
CPC ........... H01M 10/6556; H01M 10/613; H01M 10/625; H01M 50/209
See application file for complete search history.

(56) References Cited

U.S. PATENT DOCUMENTS

2013/0202940 A1* 8/2013 Gendlin .............. H01M 10/613 429/120
2014/0220391 A1 8/2014 Fujii et al.
(Continued)

FOREIGN PATENT DOCUMENTS

CN 111916611 A 11/2020
DE 102015217782 A1 3/2017

OTHER PUBLICATIONS

European Search Report dated Jan. 26, 2023 in corresponding European Patent Application No. 22184106.7, 8 pages.

*Primary Examiner* — Jimmy Vo
(74) *Attorney, Agent, or Firm* — Jeffri A. Kaminski; Venable LLP

(57) ABSTRACT

A battery stack includes a first battery module and a second battery module, each comprising battery cells being stacked in a depth direction of the battery stack. The first and second battery modules comprises a first and a second supporting side wall respectively for supporting the battery cells. The first and second battery modules include a respective bottom support plate, the first and the second battery modules include a respective first connection arrangement connecting the respective bottom plate to the respective first supporting side wall of the respective battery module. The first connection arrangements comprises connecting elements protruding from the bottom plate or from the first supporting side wall of the respective battery modules. A first common cooling plate is arranged between the first supporting side wall and the battery cells in both the first and the second battery modules, the first common cooling plate has apertures extending through the first common cooling plate and allows each of the connecting elements of the first connection arrangements to extend therethrough and the first com-
(Continued)

mon cooling plate to be between the first supporting side wall and the bottom plate of the respective battery module.

12 Claims, 4 Drawing Sheets

(51) Int. Cl.
*H01M 10/613* (2014.01)
*H01M 10/625* (2014.01)
*H01M 50/209* (2021.01)

(52) U.S. Cl.
CPC ....... *H01M 10/625* (2015.04); *H01M 50/209* (2021.01); *B60L 2200/32* (2013.01)

(56) References Cited

U.S. PATENT DOCUMENTS

| | | | | |
|---|---|---|---|---|
| 2018/0269545 | A1 | 9/2018 | Liu et al. | |
| 2019/0097189 | A1* | 3/2019 | Howe ................. | H01M 50/264 |
| 2019/0296294 | A1 | 9/2019 | Hirschbeck et al. | |
| 2020/0411821 | A1* | 12/2020 | Haeusler ............. | H01M 10/613 |

* cited by examiner

BATTERY STACK COMPRISING BATTERY MODULES AND A COOLING PLATE

TECHNICAL FIELD

The present invention relates to a battery stack for a vehicle, more specifically the present invention relates to a battery stack comprising battery modules and a cooling plate.

BACKGROUND

Batteries are becoming a common source of power for providing propulsion for vehicles. Such batteries are often rechargeable batteries and typically include a battery pack including a number of battery modules having a number of battery cells that may be connected in series or in parallel, forming a complete battery system for the vehicle.

With trucks, trailers and/commercial vehicles, space within the vehicle frame is typically at a premium because the space typically must support assorted components, such as, by way of example, air tanks, service lines, fuel tanks, fuel and electrical lines, hydraulic lines and systems, drive trains and accessories, and/or the like.

Battery packs may typically include means for controlling the temperature of the battery pack since the safety, storage capacity and charging speed of battery packs are temperature dependent. Cooling systems thus need to be able to keep the battery pack in specified temperature ranges. Liquid cooling is a popular solution within battery systems for vehicles. This involves pumping coolant through pipes and plates built into the battery packs.

Typical cooling assembly design includes cooling plate interface at the bottom of the battery modules, which may not provide sufficient coiling for demanding applications. This may furthermore not be the best solution for multilayer cell stack solutions used in truck/industrial application due to available space specifics.

In view of the above, it is an object to provide an improved cooling of the battery modules in a battery stack.

SUMMARY

It is an object of the present disclosure to provide a battery stack that at least partially overcomes the above-described deficiencies.

According to a first aspect, the present disclosure relates to a battery stack for a vehicle, the battery stack comprising a first battery module and a second battery module, each comprising battery cells being stacked in a depth direction of the battery stack. The first battery module comprises a first and a second supporting side wall and the second battery module comprises a first and a second supporting side wall for supporting the battery cells in the respective first and second battery module. The first and the second supporting side walls of the respective battery modules being opposing vertical side walls, provided on a respective side of the battery cells in the respective battery modules and extending in a height direction of the battery stack. The first and second battery modules furthermore comprises a respective bottom support plate. The first and the second battery modules comprises a respective first connection arrangement for connecting the respective bottom plate to the respective first supporting side wall of the respective battery module. The first connection arrangements comprises one or more connecting elements protruding out from the bottom plate and/or from the first supporting side wall of the respective battery modules. The battery stack furthermore comprises a first common cooling plate arranged between the first supporting side wall and the battery cells in both of the first and the second battery modules. The first common cooling plate is provided with apertures extending through the first common cooling plate. The apertures are configured for allowing each of the connecting elements of the first connection arrangements to extend therethrough and the first common cooling plate to be arranged between the first supporting side wall and the bottom plate of the respective battery module.

It is essential to include means for controlling the temperature in battery stacks, since the safety, storage capacity and charging speed of battery stacks are temperature dependent. Cooling systems are thus needed to be able to keep the battery stack in specified temperature ranges. Liquid cooling is a commonly used solution within battery systems for vehicles. This involves pumping coolant through pipes and plates built into the battery packs. Typical cooling assembly design includes cooling plate interface at the bottom of the battery modules. However, additional cooling performance is required and performance may not be achievable with bottom side cooling. The present inventors have found an advantageous construction to enable side cooling with one common cooling plate for a battery stack. The battery stack including a common cooling plate for more than one battery module allows for a direct contact and increased surface area in contact with the battery cells while allowing for a robust support for the battery cells.

The cooling plate according to the present disclosure is a cooling plate for liquid cooling. The apertures provided in the cooling enables the liquid coolant to pass between the apertures allowing cooling of a plurality of battery modules with a common cooling plate, such as for a complete stack of battery modules.

The first connection arrangements may comprise a first and a second mating connecting elements respectively. The first connecting elements may be protrusions, such as pins, protruding out from the bottom plate and/or from the first supporting side wall of the respective battery modules. The second connecting elements may be one or more recesses. The protrusions may be adapted to be in engagement with the one or more recesses thereby connecting, and optionally locking, the respective bottom plate to the respective first supporting side walls of the battery modules.

The first connecting elements may protrude from the side of the bottom plate facing the first supporting side walls of the battery modules. The first connecting elements may be a plurality of pins extending from the bottom plate of the respective battery module.

The second connecting elements may be a respective track arranged in the respective first supporting side walls of the battery modules, which may receive the first connecting elements of the bottom plate.

Alternatively, the first connecting elements may protrude from the first supporting side wall of the respective battery modules. The first connecting elements may be a plurality of pins extending from the first supporting side wall of the respective battery modules. Optionally, the bottom plate of the first and the second battery module may be arranged on top of, and be supported by, the first connecting elements of the first supporting side wall of the first and second battery modules respectively.

The first and the second battery modules may comprises a respective second connection arrangement for connecting the respective bottom plate to the respective second supporting side wall of the respective battery module. The second connection arrangement may comprise one or more connecting elements protruding out from the bottom plate and/or the second supporting side wall of the respective battery modules. The battery stack may furthermore comprise a second common cooling plate arranged between the second supporting side wall and the battery cells in both of the first and the second battery modules. The second common cooling plate may be provided with apertures extending through the second common cooling plate and being configured for allowing each of the connecting elements of the second connection arrangement to extend through the apertures and the second common cooling plate to be arranged between the second supporting side wall and the bottom plate of the respective battery module.

The second connection arrangement may comprise first and second mating connecting elements, the first connecting elements may be protrusions, such as pins, protruding out from the bottom support plate and/or from the second supporting side wall of the respective battery modules and the second connecting elements may be one or more recesses, the protrusions being adapted to be in engagement with the one or more recesses thereby connecting, and optionally locking, the respective bottom plate to the respective second supporting side walls of the battery modules.

The first connecting elements of the second connection arrangement may protrude from the side of the bottom plate facing the second supporting side walls of the battery modules. The first connecting elements of the second connection arrangement may be a plurality of pins extending from the bottom plate of the respective battery module.

The second connecting elements of the second connection arrangement may be a respective track arranged in the respective second supporting side walls of the battery modules, which may receive the first connecting elements of the bottom plate.

Alternatively, the first connecting elements of the second connection arrangement may protrude from the second supporting side wall of the respective battery modules. The first connecting elements may be a plurality of pins extending from the second supporting side wall of the respective battery modules. Optionally, the bottom plate of the first and the second battery module may be arranged on top of, and be supported by, the first connecting elements of the second supporting side wall of the first and second battery modules respectively.

The first and second side walls may extend in the height direction between a respective upper edge surface and a respective lower edge surface of the respective supporting side walls. The respective upper edge surface of the first and the second side walls of the first battery module may be provided with a respective stacking member and the respective lower edge surface of the first and the second side walls of the second battery module are provided with a respective stacking member, the stacking members of the second battery module may be configured to fit on and be supported by the stacking members of the first battery module, when stacking the second battery module onto the first battery module in the height direction.

The respective battery modules according to the present discloses may include an integrated stackable support structure for stacking of the battery modules, as seen in the height direction, and battery cells being stacked in the depth direction of the battery stack. The stackable support structure of each battery module may comprise at least a respective first and second supporting side wall comprising stacking members thereby providing improved stability for the stacked battery modules with a less complex and more cost efficient battery stack structure.

Each one of the stacking members may comprise a respective stacking step. Each stacking step may comprise or consist of a first support surface arranged at a first level and a second support surface arranged at a second level, the second level being the uppermost level, as seen in the height direction of the battery stack. The height direction of the battery stack is perpendicular to the width direction of the battery stack.

In a preferred embodiment, the battery stack comprises multiple battery modules, according to the present disclosure, being stacked in a height direction. Each of the multiple battery modules may comprise a first and a second side wall and a respective bottom plate according to the first and second battery module, the common cooling plate being arranged between the first side wall and the bottom plate of the respective battery modules. Optionally, the battery stack comprises a second cooling plate arranged between the second side wall and the bottom plate.

According to a second aspect, the electrical propulsion system may comprise an electrical machine and a battery stack according to the first aspect, wherein the electric machine is configured to receive power from the battery stack.

According to a third aspect, the present disclosure relates to a vehicle comprising a battery stack according to the first aspect or an electrical propulsion system according to the second aspect.

According to a fourth aspect, the present disclosure relates to a stationary energy storing system comprising a battery stack according to the first aspect.

According to a fifth aspect, the present disclosure relates to a marine vessel comprising the battery stack according to the first aspect.

The battery stack may thus be used in various applications, such as busses, trucks, construction equipment, marine vessels and/or industrial equipments and the present disclosure relates to each of these applications comprising a battery stack according to the present disclosure.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAIL DESCRIPTION

Figure 1:
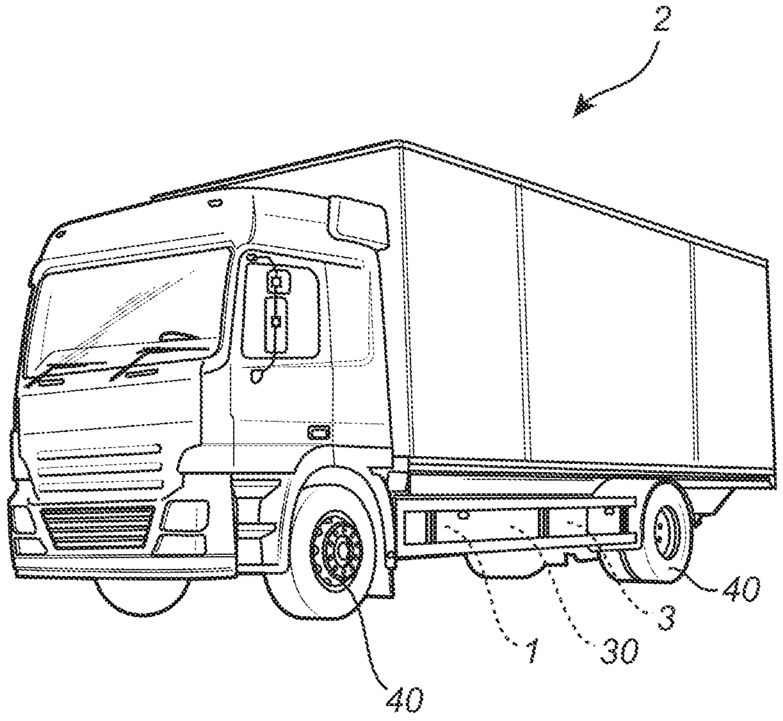
FIG. 1 is a side view of a vehicle comprising a battery stack according to the present invention.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 illustrates a vehicle 2 in the form of an electrified truck with an electrified propulsion. The electrified truck is powered by an electrical energy storage system in comprising a battery stack 1. The electrified truck 2 comprises an electrical propulsion system 3 configured to provide traction power to the vehicle 2. The electrical propulsion system 3 provides electrical power to an electrical motor 30. The electrical propulsion system comprises the battery stack 1 and the electrical motor 30. The battery stack 1 is connected to the electrical motor 30 to provide power to the electrical motor 30, thereby the electrical motor 30 can provide traction power to one or more ground engaging members, e.g. one or more wheels 40. The battery stack 1 comprises at least a first and a second battery module 4,5, each comprising a number of battery cells respectively 6,7.

Figure 2:
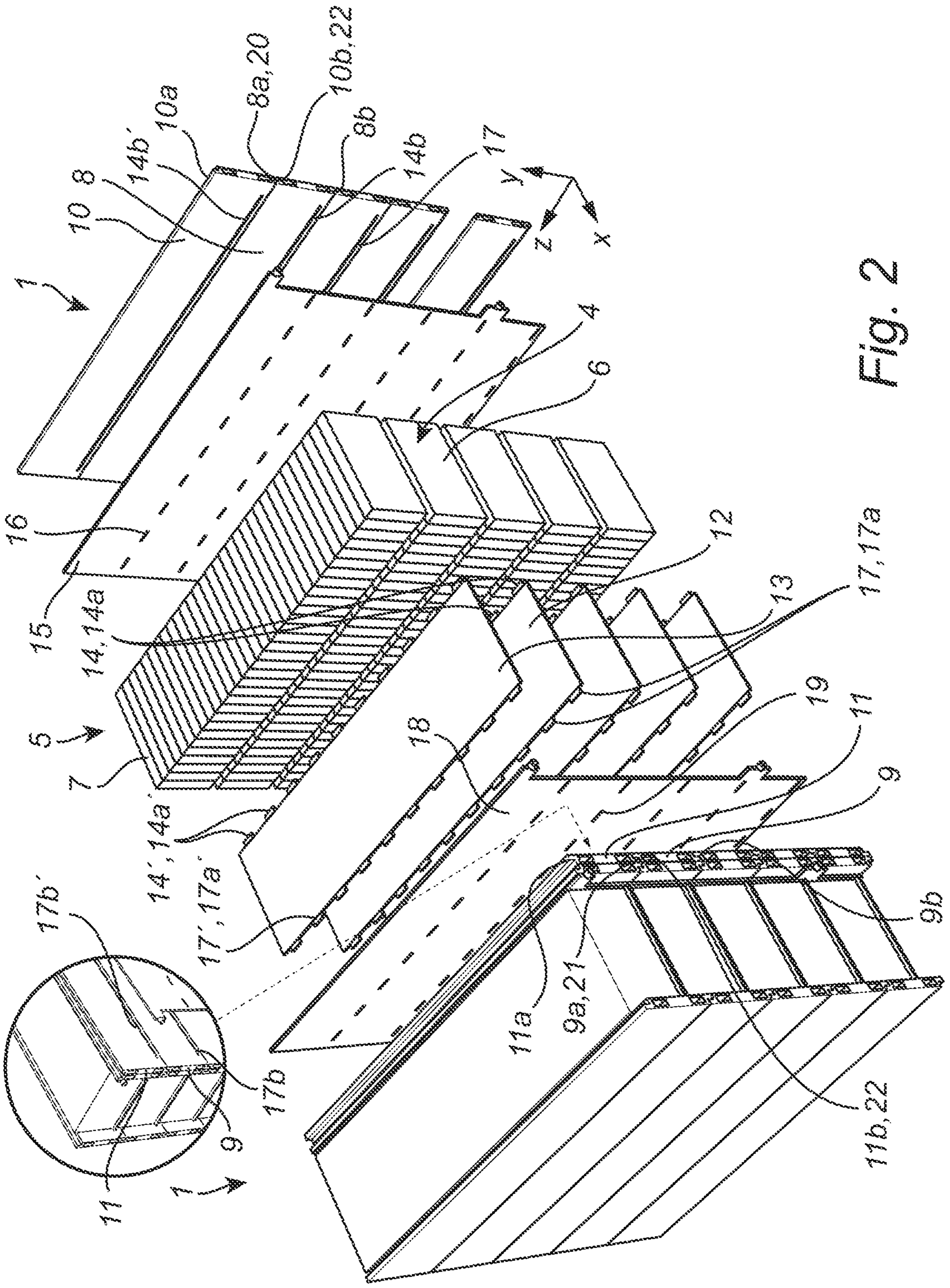
FIG. 2 is an exploded view of a battery stack according to an example of the present invention.

FIG. 2 is an exploded view of the battery stack 1 shown in FIG. 1. The battery stack 1 comprises a plurality of battery modules including the first battery module 4 and the second battery module 5. Moreover, each one of the battery modules comprises a number of battery cells 6,7 stacked in the depth direction z. The battery cells 6,7 are stacked in a depth direction z of the battery stack 1. The battery stack according to FIG. 2 comprises five battery modules in total. However, the battery stack may comprise three, four, six, seven or eight battery modules, or more. Each one of the battery modules comprises battery cells. The battery stack may generally comprise battery cells. The number of battery modules in the battery stack and the number of battery cells varies depending on type of vehicle and type of installation, etc.

The first battery module 4 comprises a first and a second supporting side wall 8,9 for supporting the battery cells 6 in the first battery module 4 and the second battery module 5 comprises a first and a second supporting side wall 10,11 for supporting the battery cells 7 in the second battery module 5. The first and the second supporting side walls 8,9,10,11 of the respective battery modules 4,5 are opposing vertical side walls 8,9,10,11, provided on a respective side of the battery cells 6,7 in the respective battery modules 4,5 and extend in a height direction Y of the battery stack 1. The first and second battery modules 4,5 furthermore comprising a respective bottom support plate 12,13 for supporting and bearing the load of the battery cells 6,7.

The first battery module 4 comprises a first and second connection arrangement 14,17 for connecting the bottom plate 12 of the first battery module 4 to the first and second supporting side walls 8,9 respectively. The first and the second connecting arrangements 14,17 of the first battery module 4 comprises a plurality of connecting elements **14*a*,17*a* here in the form of pins, protruding out from the bottom plate 12 of the first battery module 4 on a respective side of the bottom plate 12. However, the first and the second connecting elements may equally be protruding out from the first and the second supporting side walls 8,9 of the first battery module 4**.

The second battery module 5 comprises a first and second connection arrangement 14',17' for connecting the bottom plate 13 of the second battery module 5 to the respective first and second supporting side walls 10,11 of the second battery module 5. The first and the second connecting arrangements 14',17' of the second battery module 5 comprises a plurality of connecting elements **14*a*', here in the form of pins, protruding out from the bottom plate 13 of the second battery module 5 on a respective side of the bottom plate 13. However, the first and the second connecting elements may equally be protruding out from the first and the second supporting side walls 10,11 of the second battery module 5**.

The battery stack 1 furthermore comprising a first common cooling plate 15 arranged between the first supporting side walls 8,10 and the battery cells 6,7 in both of the first and the second battery modules 4,5. The first common cooling plate 15 is furthermore arranged between the first supporting side wall 8,10 and the bottom plate 12,13 of the respective battery module 4,5. The first common cooling plate 15 is provided with apertures 16 extending through the first common cooling plate 15 and being configured for allowing each of the connecting elements **14*a*,14*a*' of the first connection arrangements 14 arranged on the respective bottom plates 12,13 of the first and second battery modules 4,5 to extend therethrough. This allows the cooling plate 15 to be connected to the battery modules without bearing the load of the battery cells 6,7. The apertures 16 enables the flow of cooling liquid between the apertures and cooling of several battery modules 4,5 with a common cooling plate 15**.

The battery stack 1 additionally comprises a second common cooling plate 18, arranged between the second supporting side wall 9,11 and the battery cells 6,7 in both of the first and the second battery modules 4,5. The second common cooling plate 18 is furthermore is arranged between the second supporting side wall 9,11 and the bottom plate 12,13 of the respective battery module 4,5. The second common cooling plate 18 is provided with apertures 19 extending through the second common cooling plate 19 and being configured for allowing each of the connecting elements **17*a*,17*a*' of the second connection arrangements 17 arranged on the respective bottom plates 12,13 of the first and second battery modules 4,5** to extend therethrough.

In FIG. 2, the first connection arrangements 14,14' of the first and second battery modules 4,5 furthermore comprises second connecting elements **14*b*,14*b*', in the form of a respective track 14*b*,14*b*' provided in the respective first supporting side wall 8,10 of the first and second battery modules 4,5. The second connecting elements 14*b*,14*b*' are adapted to receive the connecting elements 14*a*,14*a*' of the first connection arrangements 14. Similarly, the second connection arrangements 17,17' of the first and second battery modules 4,5 comprise second connecting elements 17*b*,17*b*', in the form of a respective track 17*b*,17*b*' provided in the second supporting side wall 9,11 of the first and second battery modules 4,5. The second connecting elements 17*b*,17*b*' are adapted to receive the connecting elements 17*a*,17*a*' of the second connection arrangements 17**.

The first and the second side walls 8,9,10,11 of the battery modules 4,5 of the battery stack 1 illustrated in FIG. 2 extend in the height direction y between a respective upper edge surface **8*a*,9*a*,10*a*,11*a* and a respective lower edge surface 8*b*,9*b*,10*b*,11*b* of the respective vertical side walls 8,9,10,11. The respective upper edge surface 8*a*,9*a* of the first and the second side walls 8,9 of the first battery module 4 are provided with a respective stacking member 20,21 and the respective lower edge surface 10*b*,11*b* of the first and the second side walls 10,11 of the second battery module 5 are provided with a respective stacking member 22,23. The stacking members 22,23 of the second battery module 5 are configured to fit on and being supported by the stacking members 20,21 of the first battery module 4 when stacking the second battery module 5 onto the first battery module 4** in the height direction y.

Figure 3A:
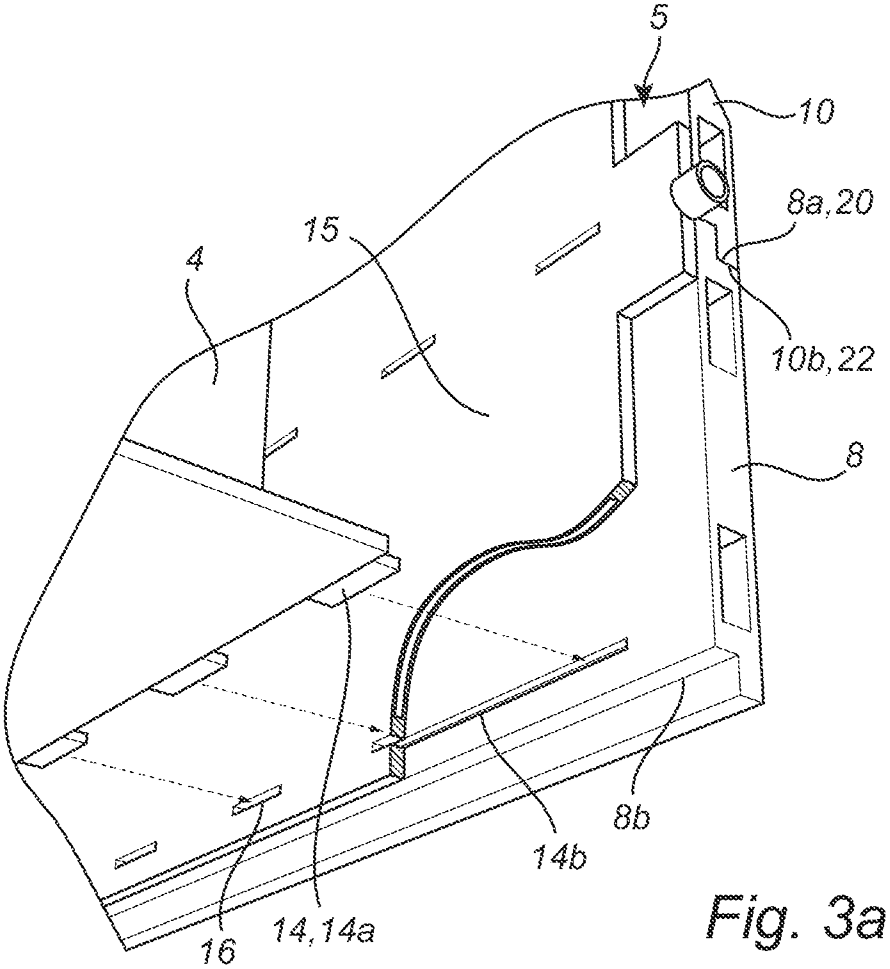
FIGS. 3*a*-3*b* are zoomed-in views of the first connection arrangement of the battery stack of FIG. 2.
Figure 3B:
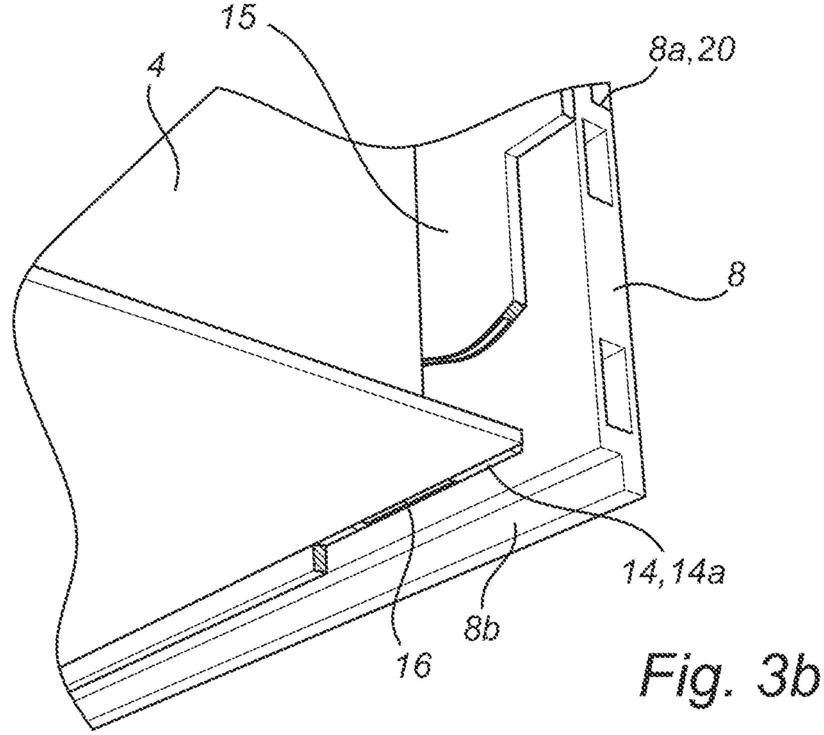

The stacking members 20,21,22,23 each comprises a respective stacking step. The five battery modules 4,5 in FIG. 2 are identical battery modules comprising upper and lower stacking members 20,21,22,23 on each of their respective upper and lower edge surfaces 8*a*,9*a*,10*a*,11*a*,8*b*, 9*b*,10*b*,11*b*. The battery stack 1 may thus preferably comprise battery modules comprising upper and lower stacking members on each of their respective upper and lower edge surfaces as disclosed in FIG. 2. FIGS. 3*a* and 3*b* are a zoomed-in view of the battery stack of FIG. 2 wherein the first connection arrangements 14 of the first modules 4 and the upper stacking member 20 and the lower stacking member 22 of the first supporting side wall of the respective first and second battery modules 4,5 are illustrated in zoomed-in view for a more detailed illustration.

The stacking members 20,21,22,23 illustrated in FIGS. 2,3*a* and 3*b* are in the form of stacking steps comprising or consisting of a first support surface arranged at a first level and a second support surface arranged at a second level, the second level being the uppermost level, as seen in the height direction y.

Figure 3C:
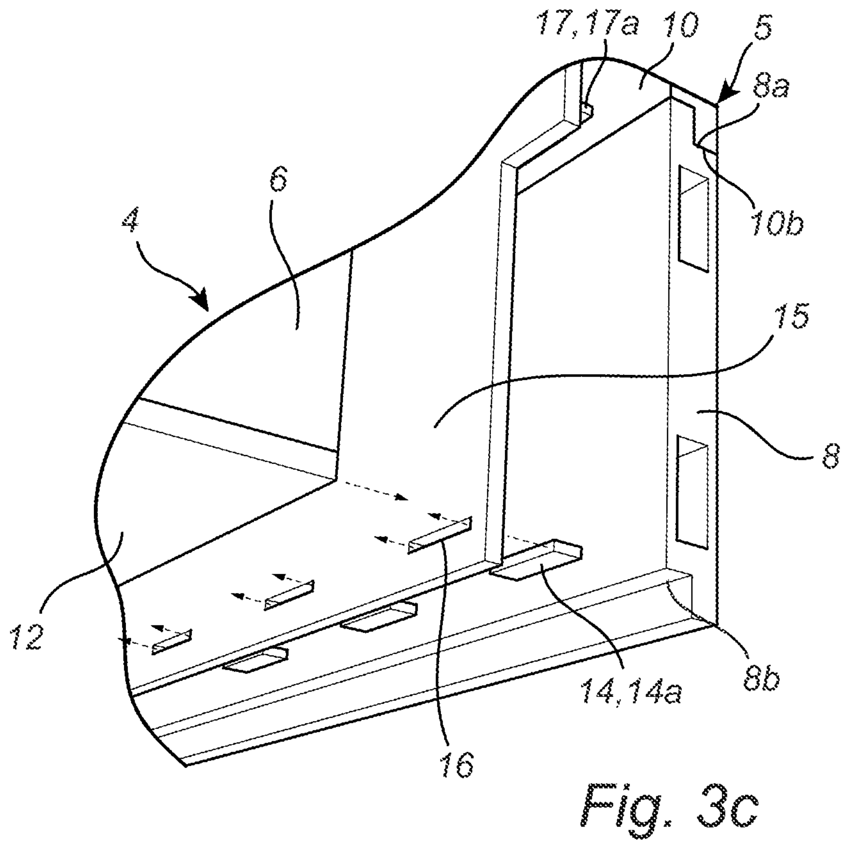
FIGS. 3*c*-3*d* are zoomed-in views of an alternative first connection arrangement according to the present disclosure.
Figure 3D:
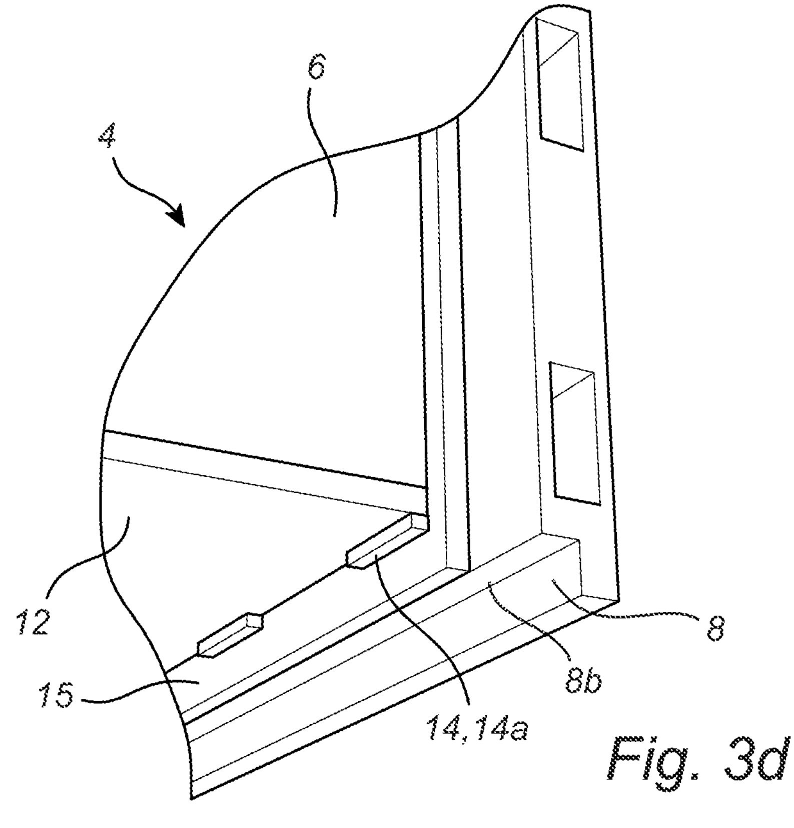

FIGS. 3*c* and 3*d* illustrate a zoomed-in view of alternative first and second battery modules 4,5 according to the present disclosure. The battery stack 1 illustrated in FIGS. 3*c* and 3*d* are identical to the battery stack 1 illustrated in FIG. 2 except that the first and second battery modules 4,5 comprise alternative first and second connection arrangements 14,17. In this connection arrangement 14,17 the respective first supporting side walls 8,10 of the first and second battery modules 4,5 are each provided with a plurality of first connecting elements 14*a*.17*a*, in the form of pins, protruding out from the respective first supporting side walls 8,10 of the first and second battery modules 4,5. The plurality of first connecting elements 14*a*,17*a* extend through apertures 16 provided in the first common cooling plate 15. The first and second battery modules 4,5 each comprises a bottom plate 12 (the bottom plate of the second battery module 5 is not shown but is identical to the bottom plate 12 of the first battery module 4). In this alternative embodiment, the bottom plates 12 of the first and second battery modules 4,5 are arranged on top of and supported by the plurality of first connecting elements 14*a*.17*a*, in the form of pins, protruding out from the respective first supporting side walls 8,10 of the first and second battery modules 4,5.

The invention claimed is:

1. A battery stack for a vehicle, the battery stack comprising a first battery module and a second battery module, each comprising battery cells being stacked in a depth direction of the battery stack, the first battery module comprises a first and a second supporting side wall and the second battery module comprises a first and a second supporting side wall for supporting the battery cells in the respective first and second battery module, the first and the second supporting side walls of the respective battery modules being opposing vertical side walls, provided on a respective side of the battery cells in the respective battery module and extending in a height direction of the battery stack, the first and second battery modules furthermore comprises a respective bottom support plate, the first and the second battery modules comprising a respective first connection arrangement for connecting the respective bottom support plate to the respective first supporting side wall of the respective battery module, the first connection arrangements comprising one or more connecting elements protruding out from the bottom support plate and/or from the first supporting side wall of the respective battery modules, the battery stack furthermore comprising a first common cooling plate arranged between the first supporting side wall and the battery cells in both of the first and the second battery modules, the first common cooling plate being provided with apertures extending through the first common cooling plate and being configured for allowing each of the connecting elements of the first connection arrangements to extend therethrough and the first common cooling plate to be arranged between the first supporting side wall and the bottom support plate of the respective battery module.

2. The battery stack according to claim 1, wherein the first connection arrangements of the first and second battery modules comprise a first and second mating connecting elements respectively, the first connecting elements being protrusions, such as pins, protruding out from the bottom support plate and/or from the first supporting side wall of the respective battery modules and the second connecting elements being one or more recesses, the protrusions being adapted to be in engagement with the one or more recesses thereby connecting, and optionally locking, the respective bottom support plate to the respective first supporting side walls of the battery modules.

3. The battery stack according to claim 2, wherein the second mating connecting elements is a respective track in the respective first supporting side wall or the bottom support plate adapted to receive the first connecting elements of the other one of the respective first supporting side wall or the bottom support plate.

4. The battery stack according to claim 1, wherein the first and the second battery modules comprises a respective second connection arrangement for connecting the respective bottom support plate to the respective second supporting side wall of the respective battery module, the second connection arrangement comprising one or more connecting elements protruding out from the bottom support plate and/or the second supporting side wall of the respective battery modules the battery stack furthermore comprises a second common cooling plate arranged between the second supporting side wall and the battery cells in both of the first and the second battery modules, the second common cooling plate being provided with apertures extending through the second common cooling plate and being configured for allowing each of the connecting elements of the second connection arrangement to extend therethrough and the second common cooling plate to be arranged between the second supporting side wall and the bottom support plate of the respective battery module.

5. The battery stack according to claim 4, wherein the second connection arrangement comprises first and second mating connecting elements, the first connecting elements being protrusions, such as pins, protruding out from the bottom support plate and/or from the second supporting side wall of the respective battery modules and the second connecting elements being one or more recesses, the protrusions being adapted to be in engagement with the one or more recesses thereby connecting, and optionally locking, the respective bottom support plate to the respective second supporting side walls of the battery modules.

6. The battery stack according to claim 5, wherein the second mating connecting elements of the second connection arrangement is a respective track in the respective second supporting side wall or the bottom support plate adapted to receive the first connecting elements of the second connection arrangement of the other one of the respective second supporting side wall or the bottom support plate.

7. The battery stack according to claim 1, wherein the first and second side walls extend in the height direction between a respective upper edge surface and a respective lower edge surface of the respective supporting side walls, the respective upper edge surface of the first and the second side walls of the first battery module being provided with a respective stacking member and the respective lower edge surface of the first and the second side walls of the second battery module are provided with a respective stacking member, the stacking members of the second battery module being configured to fit on and being supported by the stacking members of the first battery module when stacking the second battery module onto the first battery module in the height direction.

8. The battery stack according to claim 7, wherein each of the respective stacking members comprises a respective stacking step.

9. An electrical propulsion system comprising an electric motor and a battery stack according to claim 1, wherein the electric motor is configured to receive power from the battery stack.

10. A vehicle comprising a battery stack according to claim 1.

11. A stationary energy storing system comprising a battery stack according to claim 1.

12. A marine vessel comprising a battery stack according to claim 1.

* * * * *